(12) United States Patent
Chu et al.

(10) Patent No.: US 11,381,577 B2
(45) Date of Patent: Jul. 5, 2022

(54) TECHNIQUES INVOLVING A SECURITY HEAT MAP

(71) Applicant: Citrix Systems, Inc., Fort Lauderdale, FL (US)

(72) Inventors: Xiaolu Chu, Nanjing (CN); Jiandong Hong, Nanjing (CN); Dai Li, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 329 days.

(21) Appl. No.: 16/481,533

(22) PCT Filed: Mar. 29, 2019

(86) PCT No.: PCT/CN2019/080476
§ 371 (c)(1),
(2) Date: Jul. 29, 2019

(87) PCT Pub. No.: WO2020/198958
PCT Pub. Date: Oct. 8, 2020

(65) Prior Publication Data
US 2021/0328999 A1 Oct. 21, 2021

(51) Int. Cl.
*H04L 9/40* (2022.01)
(52) U.S. Cl.
CPC ........ *H04L 63/107* (2013.01); *H04L 63/0876* (2013.01); *H04L 63/102* (2013.01); *H04L 63/1425* (2013.01); *H04L 63/20* (2013.01)
(58) Field of Classification Search
CPC .. H04L 63/107; H04L 63/0876; H04L 63/102

USPC .......................................................... 726/26
See application file for complete search history.

(56) References Cited

U.S. PATENT DOCUMENTS

| | | | |
|---|---|---|---|
| 8,869,235 | B2 | 10/2014 | Qureshi et al. |
| 8,886,925 | B2 | 11/2014 | Qureshi et al. |
| 9,137,262 | B2 | 9/2015 | Qureshi et al. |
| 9,143,529 | B2 | 9/2015 | Qureshi et al. |
| 9,143,530 | B2 | 9/2015 | Qureshi et al. |
| 9,183,380 | B2 | 11/2015 | Qureshi et al. |
| 9,210,534 | B1 | 12/2015 | Matthieu et al. |
| 9,286,471 | B2 | 3/2016 | Qureshi et al. |

(Continued)

OTHER PUBLICATIONS

International Search Report for International Application No. PCT/CN2019/080476 mailed from the International Searching Authority (CN) dated Jan. 8, 2020, 9 pages.

*Primary Examiner* — Anthony D Brown
(74) *Attorney, Agent, or Firm* — BainwoodHuang

(57) ABSTRACT

A technique utilizes a security heat map associated with a geographic region. The technique involves receiving, by a server, current heat scores for one or more endpoint devices located within the geographic region. The technique further involves providing, by the server, for areas within the geographic region, respective aggregate heat scores based on the current heat scores for the one or more endpoint devices. The technique further involves, based on the respective aggregate heat scores for the areas within the geographic region, generating, by the server, a security heat map defining one or more security zones within the geographic region. The technique further involves imposing, by the server, security policies on the one or more endpoint devices based on the security heat map.

21 Claims, 13 Drawing Sheets

(56) References Cited

U.S. PATENT DOCUMENTS

| | | |
|---|---|---|
| 9,378,359 B2 | 6/2016 | Qureshi et al. |
| 9,529,996 B2 | 12/2016 | Qureshi et al. |
| 9,727,669 B1 * | 8/2017 | Wilson .................. G01C 21/165 |
| 10,469,534 B2 | 11/2019 | Qureshi et al. |
| 10,498,658 B2 | 12/2019 | Murgia |
| 10,715,576 B2 | 7/2020 | Parthasarathy |
| 10,721,134 B2 | 7/2020 | Papaloukopoulos et al. |
| 10,841,316 B2 | 11/2020 | Innes et al. |
| 10,862,756 B2 | 12/2020 | Gupta et al. |
| 10,972,358 B2 | 4/2021 | Papaloukopoulos et al. |
| 2013/0035063 A1 * | 2/2013 | Fisk .................. H04M 1/72463 455/410 |
| 2014/0086177 A1 | 3/2014 | Adjakple et al. |
| 2014/0157353 A1 | 6/2014 | Shim et al. |
| 2016/0070626 A1 | 3/2016 | Raghavendra |
| 2016/0142497 A1 | 5/2016 | Ullrich |
| 2016/0352729 A1 | 12/2016 | Malik |
| 2018/0197262 A1 | 7/2018 | Bhageria et al. |
| 2019/0028943 A1 | 1/2019 | Wang et al. |
| 2019/0089732 A1 | 3/2019 | Thomas et al. |
| 2019/0246342 A1 | 8/2019 | Wang et al. |
| 2020/0013040 A1 | 1/2020 | Kang |
| 2020/0288306 A1 * | 9/2020 | Do ...................... H04L 63/1433 |

* cited by examiner

TECHNIQUES INVOLVING A SECURITY HEAT MAP

BACKGROUND

A conventional approach to performing authentication involves comparing a current set of authentication factors from a user device, which is operated by a user, to an expected set of authentication factors. If the current set of authentication factors matches the expected set of authentication factors, authentication is considered successful. However, if the current set of authentication factors does not match the expected set of authentication factors, authentication is considered unsuccessful.

Such authentication may be used to control access to a computerized resource. Along these lines, if authentication is considered successful, the user device is provided access to the computerized resource. However, if authentication is considered unsuccessful, the user device is denied access to the computerized resource.

SUMMARY

It should be understood that the above-described conventional authentication approach is extremely inflexible. For example, it may be convenient to require a relatively weak form of authentication when an employee of a company logs on to a work laptop while at the company's office. However, a stronger form of authentication may be required for authentication on the same work laptop when the laptop currently resides in a less-trusted environment such as at a café or at a hotel in a different city. Unfortunately, the above-described conventional authentication approach is limited in that it does not impose different types of authentication based on the location of the work laptop.

One way to address this lack of flexibility is for the company to install geofencing technology at the company's office facility. Along these lines, the company may add specialized equipment (e.g., wireless transceivers such as IEEE 802.11 or 802.15 transceivers, etc.) to establish a fixed geofenced zone over the company's office facility. When the employee then uses the laptop within the geofenced zone, the employee is required to login using a standard form of authentication (e.g., a password) since the employee is currently within the company's office facility. However, when the employee uses the laptop outside of the geofenced zone, the employee is required to login using a stronger form of authentication (e.g., a password and a one-time pass code (OTP)) since the employee is currently in a less trusted area.

Improved techniques are directed to controlling access to a protected resource using a heat map that defines different zones of trustworthiness within a geographic region. For example, an endpoint device may require (i) relatively weak authentication when the endpoint device is within a well-trusted zone defined by the heat map, (ii) stronger authentication when the endpoint device is within a less-trusted zone defined by the heat map, and so on. Moreover, the zones defined by the heat map may change over time (e.g., boundaries between zones may move, zones may grow/shrink, etc.) based on a variety of factors such as the presence/absence of other trustworthy devices within the vicinity, the time of day, recent events, etc. With such improved techniques, the heat map enables virtual geofencing for access control to be established over any geographic region.

For example, suppose that an employee of a company brings an endpoint device such as a laptop computer to an out of state conference to enable the employee to access a protected resource such as a confidential file, email, a virtual desktop, etc. A datacenter may remotely monitor the current location of the endpoint device (e.g., via a location signal sent from the laptop computer) and see that the employee is alone at an unfamiliar location. Accordingly, the datacenter may generate a heat map that defines a zone of low trustworthiness for the unfamiliar location and, since the endpoint device is within the zone of low trustworthiness, require strong authentication from the endpoint device such as a valid password and a valid OTP from a hardware token in the employee's possession. In such a situation, it is considered acceptable to burden the employee with having to possess and operate the hardware token to obtain the OTP for successful authentication. Such features protect against undesirable situations such as someone stealing the endpoint device and attempting to access the protected resource from a remote location.

Alternatively, suppose that an entire team of employees travels to the out of state conference and that each employee brings a respective endpoint device. In this situation, it may be considered too burdensome or too inconvenient to require every employee to bring a hardware token and enter both a password and an OTP to successfully authenticate. Rather, the datacenter may monitor the current locations of all of the endpoint devices and see that the employees are together within the same conference hall. Accordingly, the datacenter may generate a heat map that defines a zone of relatively strong trustworthiness that covers the conference hall even if that location is new and unfamiliar. As a result, the datacenter may simply require routine authentication from each endpoint device such as just a valid password (i.e., it is clear that the entire team of employees are together) rather than require every employee at the conference to carry and operate a hardware token for authentication. That is, the datacenter may consider requiring each employee to carry and use a respective hardware token to be excessive in guarding against the extreme unlikely situation of someone stealing all of the endpoint devices and attempting to access all of the protected resources from the same location.

One embodiment is directed to a method involving a security heat map associated with a geographic region. The method includes receiving, by a server, current heat scores for one or more endpoint devices located within the geographic region. The method further includes providing, by the server, for areas within the geographic region, respective aggregate heat scores based on the current heat scores for the one or more endpoint devices. The method further includes, based on the respective aggregate heat scores for the areas within the geographic region, generating, by the server, a security heat map defining one or more security zones within the geographic region. The method further includes imposing, by the server, security policies on the one or more endpoint devices based on the security heat map.

In some arrangements, providing the respective aggregate heat scores include, for each area within the geographic region, calculating a respective aggregate heat score based on current heat scores for endpoint devices currently located within that area.

In some arrangements, the method further includes receiving security scores and mobility scores for the one or more endpoint devices, and providing the current heat scores for the one or more endpoint devices based on the security scores and mobility scores.

In some arrangements, providing the current heat scores for the endpoint devices includes generating a first current heat score for a first endpoint device based on a first security score and a first mobility score for the first endpoint device, and generating a second current heat score for a second endpoint device based on a second security score and a second mobility score for the second endpoint device. The first endpoint device is different from the second endpoint device.

In some arrangements, the method further includes providing, as the first security score, a current measure of trustworthiness contributed by the first endpoint device while the first endpoint device is operated by a first user. The method further includes providing, as the first mobility score, a current measure of mobility for the first endpoint device while the first endpoint device is operated by the first user. The method further includes providing, as the second security score, a current measure of trustworthiness contributed by the second endpoint device while the second endpoint device is operated by a second user that is different from the first user. The method further includes providing, as the second mobility score, a current measure of mobility for the second endpoint device while the second endpoint device is operated by the second user.

In some arrangements, the first endpoint device currently resides in a first area within the geographic region, and the second endpoint device currently resides in a second area within the geographic region that is different from the first area. Additionally, calculating the respective aggregate heat score for each area includes providing a first aggregate heat score for the first area based on the first current heat score for the first endpoint device, and providing a second aggregate heat score for the second area based on the second current heat score for the second endpoint device.

In some arrangements, both the first endpoint device and the second endpoint device currently reside in a particular area within the geographic region. Additionally, calculating the respective aggregate heat score for each area includes providing a particular aggregate heat score for the particular area based on the first current heat score for the first endpoint device and the second current heat score for the second endpoint device.

In some arrangements, calculating the respective aggregate heat score for each area includes, for a first area within the geographic region, calculating a first aggregate heat score based on current heat scores for a group of first endpoint devices currently located in the first area, and for a second area within the geographic region, calculating a second aggregate heat score based on current heat scores for a group of second endpoint devices currently located in the second area. The second area is different from the first area, and the second endpoint devices being different from the first endpoint devices.

In some arrangements, generating the security heat map defining the one or more security zones within the geographic region includes, based on the first aggregate heat score selecting, among multiple selectable security levels, a first security level for the first area to provide at least a portion of a first security zone within the geographic region, and based on the second aggregate heat score selecting, among the multiple selectable security levels, a second security level for the second area to provide at least a portion of a second security zone within the geographic region that is different from the first security zone.

In some arrangements, generating the security heat map defining the one or more security zones within the geographic region includes based on the first aggregate heat score selecting, among multiple selectable security levels, a particular security level for the first area to provide at least a portion of a particular security zone within the geographic region, and based on the second aggregate heat score selecting, among the multiple selectable security levels, the particular security level for the second area to provide at least a further portion of the particular security zone within the geographic region.

In some arrangements, the method further includes, after the security heat map is generated, receiving an indication signal indicating occurrence of an area specific event, the indication signal identifying a particular area within the geographic region, and in response to the indication signal, calculating a new aggregate heat score for the particular area and replacing an earlier aggregate heat score for the particular area with the new aggregate heat score.

In some arrangements, the method further includes, based on the new aggregate heat score selecting, among multiple selectable security levels, a particular security level for the particular area to update the security heat map defining the one or more security zones within the geographic region.

In some arrangements, a first selectable security level was selected for the particular area based on the earlier aggregate heat score prior to receiving the indication signal. Additionally, selecting the particular security level includes choosing, as the particular security level, a second selectable security level for the particular area based on the new aggregate heat score, the second selectable security level being different from the first selectable security level.

In some arrangements, receiving the indication signal indicating the occurrence of the area specific event includes receiving, as part of the indication signal, an indication that the number of endpoint devices residing within the particular area has changed by more than a predefined threshold number within a predefined amount of time.

In some arrangements, receiving the indication signal indicating the occurrence of the area specific event includes receiving, as part of the indication signal, an indication that a predefined number of endpoint devices residing within the particular area have detected a security incident.

In some arrangements, the method further includes, after receiving the indication signal and before calculating the new aggregate heat score, receiving new heat scores for endpoint devices currently located within the particular area. The new aggregate heat score for the particular area is calculated based on the new heat scores.

In some arrangements, the method further includes, in response to the indication signal, calculating new aggregate heat scores for other areas within the geographic region and replacing earlier aggregate heat scores for the other areas with the new aggregate heat scores.

In some arrangements, imposing the security policies on the one or more endpoint devices based on the security heat map includes instructing, based on the security heat map, each of the one or more endpoint devices to apply a selected security policy. Such policies may include particular requirements for authentication, sets of privileges, particular services that are provided, and so on.

Another embodiment is directed to a computer program product having a non-transitory computer readable medium that stores a set of instructions involving a security heat map associated with a geographic region. The set of instructions, when carried out by computerized circuitry, causes the computerized circuitry to perform a method of:
(A) receiving current heat scores for one or more endpoint devices located within the geographic region;
(B) providing for areas within the geographic region, respective aggregate heat scores based on the current heat scores for the one or more endpoint devices;

(C) based on the respective aggregate heat scores for the areas within the geographic region, generating a security heat map defining one or more security zones within the geographic region; and (D) imposing security policies on the one or more endpoint devices based on the security heat map.

Yet another embodiment is directed to an electronic apparatus which includes a communications interface, memory, and control circuitry coupled to the communications interface and the memory. The memory stores instructions that, when carried out by the control circuitry, cause the control circuitry to:

(A) receive current heat scores for one or more endpoint devices located within a geographic region, (B) provide for areas within the geographic region, respective aggregate heat scores based on the current heat scores for the one or more endpoint devices, (C) based on the respective aggregate heat scores for the areas within the geographic region, generate a security heat map defining one or more security zones within the geographic region, and (D) impose security policies on the one or more endpoint devices based on the security heat map.

It should be understood that, in the cloud context, some electronic circuitry is formed by remote computer resources distributed over a network. Such a computerized environment is capable of providing certain advantages such as distribution of hosted services and resources (e.g., software as a service, platform as a service, infrastructure as a service, etc.), enhanced scalability, etc.

Other embodiments are directed to electronic systems and apparatus, processing circuits, computer program products, and so on. Some embodiments are directed to various methods, electronic components and circuitry that involve a security heat map.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Overview

There are deficiencies in conventional user devices that impose rigid authentication requirements. For example, successful authentication via such a user device may rigidly require a correct password if the user device is in an established location such as the user's office, and may rigidly require both a correct password and a correct one-time passcode (OTP) if the user device is in a new location. Due to this lack of flexibility, the user devices for an entire team of users at a new location would require the entire team of users to provide correct passwords and correct OTPs even though the entire team of users is together (i.e., a situation in which there is significantly lower security risk due to multiple users being together).

However, an improved technique is directed to controlling access to a set of protected resources using a heat map that defines different zones of trustworthiness within a geographic region. Along these lines, an endpoint device may impose (i) standard security requirements when the endpoint device is within a well-trusted zone defined by the heat map, (ii) stronger security requirements when the endpoint device is within a less-trusted zone defined by the heat map, and so on. Moreover, the zones defined by the heat map may change over time (e.g., boundaries between zones may move, zones may grow/shrink, etc.) based on a variety of factors such as movement and operation of other trustworthy devices within the vicinity, the time of day, recent events, etc. With such a technique and flexibility, the heat map enables virtual geofencing to be established for access control over any geographic region.

The individual features of the particular embodiments, examples, and implementations disclosed herein can be combined in any desired manner that makes technological sense. Moreover, such features are hereby combined in this manner to form all possible combinations, permutations and variants except to the extent that such combinations, permutations and/or variants have been explicitly excluded or are impractical. Support for such combinations, permutations and variants is considered to exist in this document.

Figure 1:
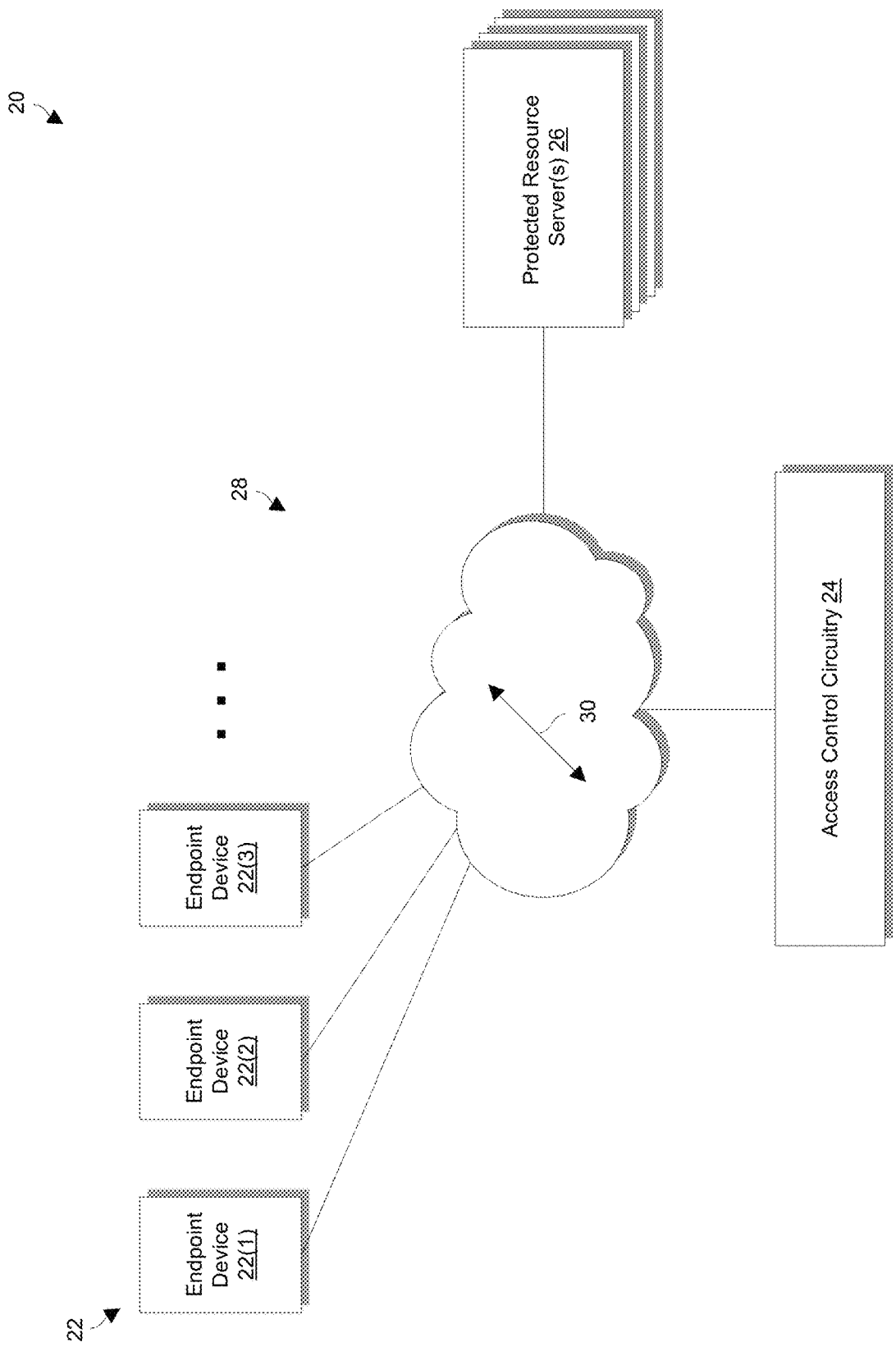
FIG. 1 is a block diagram of a computerized system that controls access to a protected resource using a heat map that defines different zones of trustworthiness within a geographic region in accordance with certain embodiments.

FIG. 1 is a block diagram of a computerized system 20 that controls access to a set of protected resources using a heat map that defines different zones of trustworthiness within a geographic region. The computerized system 20 includes endpoint devices 22(1), 22(2), 22(3), . . . (collectively, endpoint devices 22), access control circuitry 24, a set of protected resource servers 26, and a communications medium 28.

Each endpoint device 22 is constructed and arranged to perform useful work on behalf of a human user (e.g., access files/email/accounts/other data/virtual desktops/etc., run applications, complete transactions, generate/edit/output content, consume or provide other electronic services, combinations thereof, etc.). Suitable electronic apparatus for the endpoint devices 22 include smart phones, tablets, portable laptops, desktop computers, workstations, workspace hubs, specialized equipment, combinations thereof, and the like.

The access control circuitry 24 is constructed and arranged to control access to one or more protected resources 26 using a heat map that defines different zones of trustworthiness within a geographic region. As will be explained in further detail shortly, such heat map use enables the access control circuitry 24 to dynamically construct virtual geofencing over remote geographic regions for security purposes.

The access control circuitry 24 may be formed by different equipment configurations such as by a single server computer, by multiple computers organized as a cluster, by a server farm, and so on. Additionally, the access control circuitry 24 may reside at a single location or among multiple locations.

Each protected resource server 26 is constructed and arranged to provide an endpoint device 22 with access to a protected resource when the access control circuitry 24 grants access the endpoint device 22 with access to that protected resource (e.g., following successful authentication). Furthermore, the protected resource servers 26 deny access to the protected resources when the access control circuitry 24 does not grant access to the protected resources (e.g., in the absence of successful authentication). By way of example, the protected resource servers 26 include enterprise equipment, virtualization platforms that remotely host applications and/or provide remote services, remote content servers, remote transaction servers, gateways, datacenters, combinations thereof, etc.

The communications medium 28 is constructed and arranged to connect the various components of the computerized system 20 together to enable these components to exchange electronic signals 30 (e.g., see the double arrow 30). At least a portion of the communications medium 28 is illustrated as a cloud to indicate that the communications medium 28 is capable of having a variety of different structures (e.g., wired, wireless, a combination thereof, etc.) and topologies (e.g., backbone, hub-and-spoke, loop, irregular, combinations thereof, and so on). Along these lines, the communications medium 28 may include copper-based data communications devices and cabling, fiber optic devices and cabling, wireless devices, combinations thereof, etc. Furthermore, the communications medium 28 is capable of supporting LAN-based communications, wireless or cellular communications, combinations thereof, and so on.

During operation of the computerized system 20, endpoint devices 22 operate as endpoint devices within the computerized system 20 to perform useful work at one or more locations. Such work may involve accessing a set of protected resources such as files, email, virtual desktops, databases, services, combinations thereof, etc. Such access may be remote (i.e., accessing the protected resource servers 26 and/or local (i.e., accessing protected resources within the endpoint devices 22). To this end, some users may operate smart phones and tablets while routinely traveling to and/or among different locations. Additionally, other users may operate laptops while primarily working at the office, occasionally at home, and so on. Furthermore, other users may operate desktop computers at the office and, on rare occasion, move the desktop computers (e.g., when moving to a new office location, when moving from primarily working from home to a new role in the office, etc.), and so on. Moreover, some users may operate more than one endpoint device 22 within the computerized system 20 (e.g., a user may operate a smart phone and a workstation, etc.).

During such operation, the computerized system 20 performs operations to construct heat maps for different geolocations and then uses the heat maps to control access to protected resources within the computerized system 20. While such operations will be referred to herein as being performed by the access control circuitry 24, such operations may be performed in a distributed manner among various components of the computerized system 20 (e.g., among the access control circuitry 24, the endpoint devices 22, the protected resource servers 26, combinations thereof, etc.).

Such access control operations include retrieval operations that retrieve a security score (S) and a mobility score (M) for each endpoint device 22. The security score (S) is a current measure of trustworthiness contributed by that endpoint device 22. Furthermore, the mobility score (M) is a current measure of mobility for that endpoint device 22.

Additionally, the access control operations include tracking the geolocations of the endpoint devices 22 as they move among different geolocations within the computerized system 20. Such tracking may be based on location signals from each endpoint device 22 (e.g., from global positioning system (GPS) circuitry within each endpoint device 22), from cellular towers, from adjacent nearby equipment (e.g., wireless access points), combinations thereof, and so on.

Such operations further include performing heat score generation operations to generate an overall heat score (OH) for each area (i.e., each geographical location) where there is at least one endpoint device 22. In some arrangements, certain heat score generation operations involve generating an individual heat score (H) that represents a measure of "heat" for each endpoint device 22 based on the security score (S) and the mobility score (M) for that endpoint device 22. With the individual heat score (H) for an endpoint device 22 based on the security score (S) and the mobility score (M) from that endpoint device 22, the individual heat score (H) represents a local contribution of trustworthiness for that endpoint device 22 to an area (e.g., the geolocation) in which that endpoint device 22 currently resides.

The heat score generation operations further involve generating, as the overall heat score (OH) for each area, an aggregate heat score for that area from the individual heat scores (H) for all of the endpoint devices 22 currently residing in that area (e.g., summing the individual heat scores (H) for endpoint devices 22 in that area). Accordingly, the overall heat score (OH) represents a locale-specific measure of trustworthiness for that area. In some arrangements, the granularity of each area is based on the precision of the endpoint device location signals that identify the particular geolocations of the endpoint devices 22 (e.g., a 3 meter by 3 meter area, a 10 meter by 10 meter area, a one acre area, etc.).

Additionally, the operations involve selecting a set of heat score thresholds to be used for identifying borders between different zones of trustworthiness. Such selection may involve selecting among different predefined sets of heat score thresholds, making adjustments to a default set of thresholds, combinations thereof, etc. A variety of factors may influence selection of the set of heat score thresholds such as time of day, whether there has been a recent security event, etc. In some arrangements, selection of one or more of the heat score thresholds is based on analytics (e.g., the application of machine learning/artificial intelligence over time, based on a comparison of current factors to a profile or historical factors, etc.).

Subsequently, system 20 applies the set of heat score thresholds to the overall heat score (OH) for each area to identify appropriate security levels for each area. Combining the identified security levels for adjacent areas results in a heat map covering a geographic region having different security zones where each zone includes areas having the same level of trustworthiness. That is, the areas within each security zone have overall heat scores (OH) within the same range as defined by the selected set of heat score thresholds.

For example, a particular heat map may include a first zone of high trustworthiness, a second zone of lower trustworthiness, and so on. The particular number of zones in the particular heat map depends on how the thresholds are defined (e.g., how many threshold ranges are defined) within the selected set of heat score thresholds and the diversity of overall heat scores (OH) for the areas forming the geographic region that is covered by the particular heat map.

Figure 2:
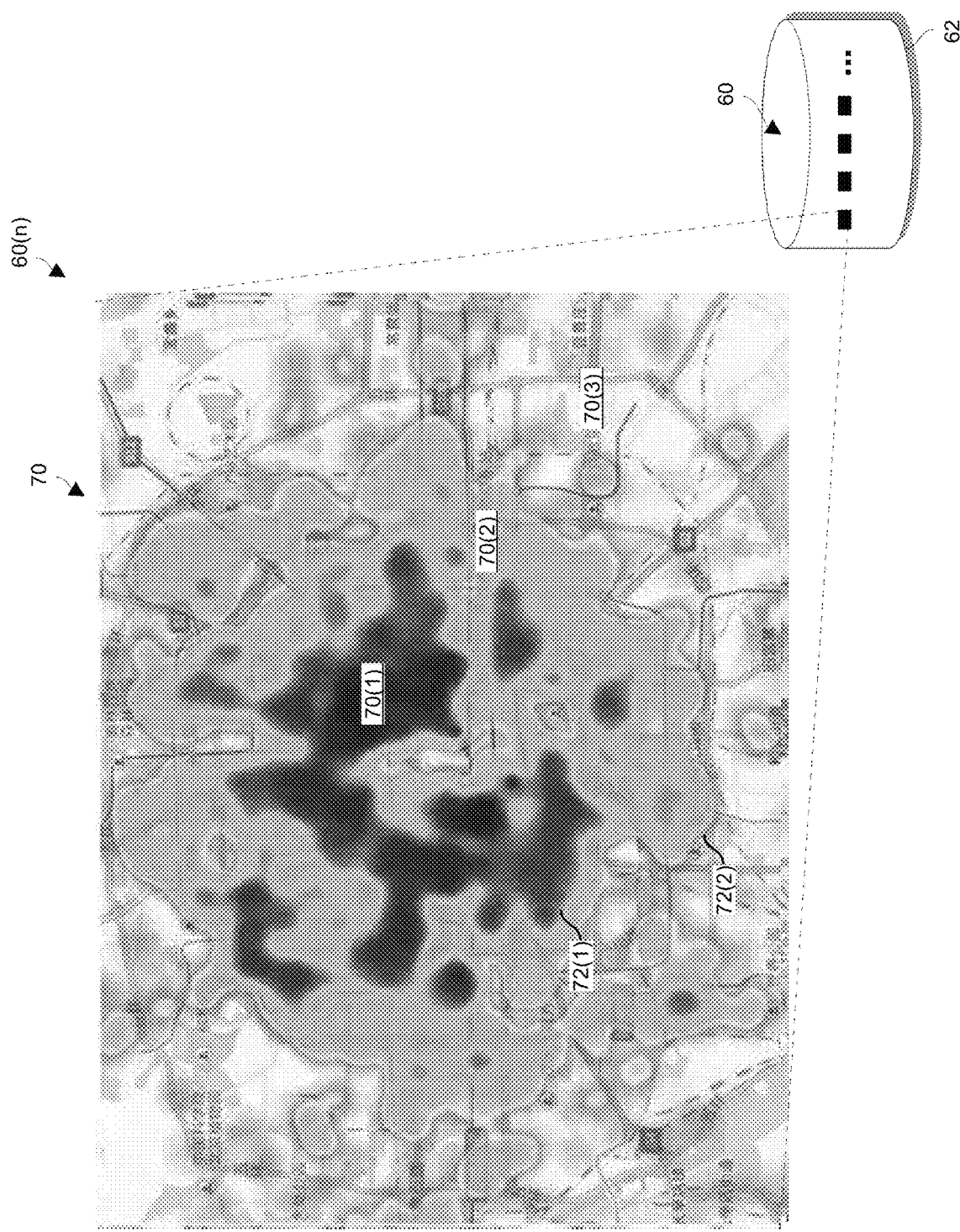
FIG. 2 is a diagram which includes a view of an example heat map that is utilized by the computerized system during access control in accordance with certain embodiments.

FIG. 2 shows heat maps 60 that system 20 generates and utilizes to control access to protected resources within the computerized system 20. In some arrangements, the heat maps 60 reside within a repository 62 resides within the access control circuitry 24 (also see FIG. 1).

A pictorial view of an example heat map 60(n) is shown in FIG. 2 as covering a particular geographic region. As shown, the example heat map 60(n) includes multiple zones 70(1), 70(2), 70(3) of trustworthiness (collectively, security zones 70) which are separated by borders or boundaries 72(1), 72(2) (collectively, borders 72). The zone 70(1) (i.e., the darkest areas within the heat map 60) represents areas of high trustworthiness because the overall heat score (OH) for each area belonging to the zone 70(1) falls within a threshold range for high trustworthiness. Additionally, the zone 70(2) (i.e., the next darkest areas within the heat map 60) represents areas of moderate trustworthiness because the overall heat score (OH) for each area belonging to the zone 70(2) falls within a different threshold range for moderate trustworthiness. Furthermore, the zone 70(3) (i.e., the lightest areas within the heat map 60) represents areas of low trustworthiness because the overall heat score (OH) for each area belonging to the zone 70(3) falls within yet a different threshold range for low trustworthiness.

Essentially, each zone 70 can be considered as a virtual geofenced area which is generated by system 20 for imposing a particular level of security based on input from multiple endpoint devices 22 in the vicinity, e.g., in a crowdsourced manner. For any endpoint devices 22 (also see FIG. 1) in the first zone 70(1) of high trustworthiness, system 20 imposes a first level of security (e.g., a standard form of authentication) such as requiring a password. However, for any endpoint devices 22 in the second zone 70(2) of moderate trustworthiness, system 20 imposes a second level of security (e.g., a stronger form of authentication) such as requiring a password and an OTP from a user-issued hardware token. Furthermore, for any endpoint devices 22 in the third zone 70(3) of low trustworthiness, system 20 imposes a third level of security (e.g., an even stronger form of authentication) such as requiring a password, an OTP, and a particular biometric factor (e.g., finger print scan, a retinal scan, a voice print sample, etc.). Such operation thus provides a flexible and effective technique for imposing security based on the presence of other endpoint devices 22.

Figure 3:
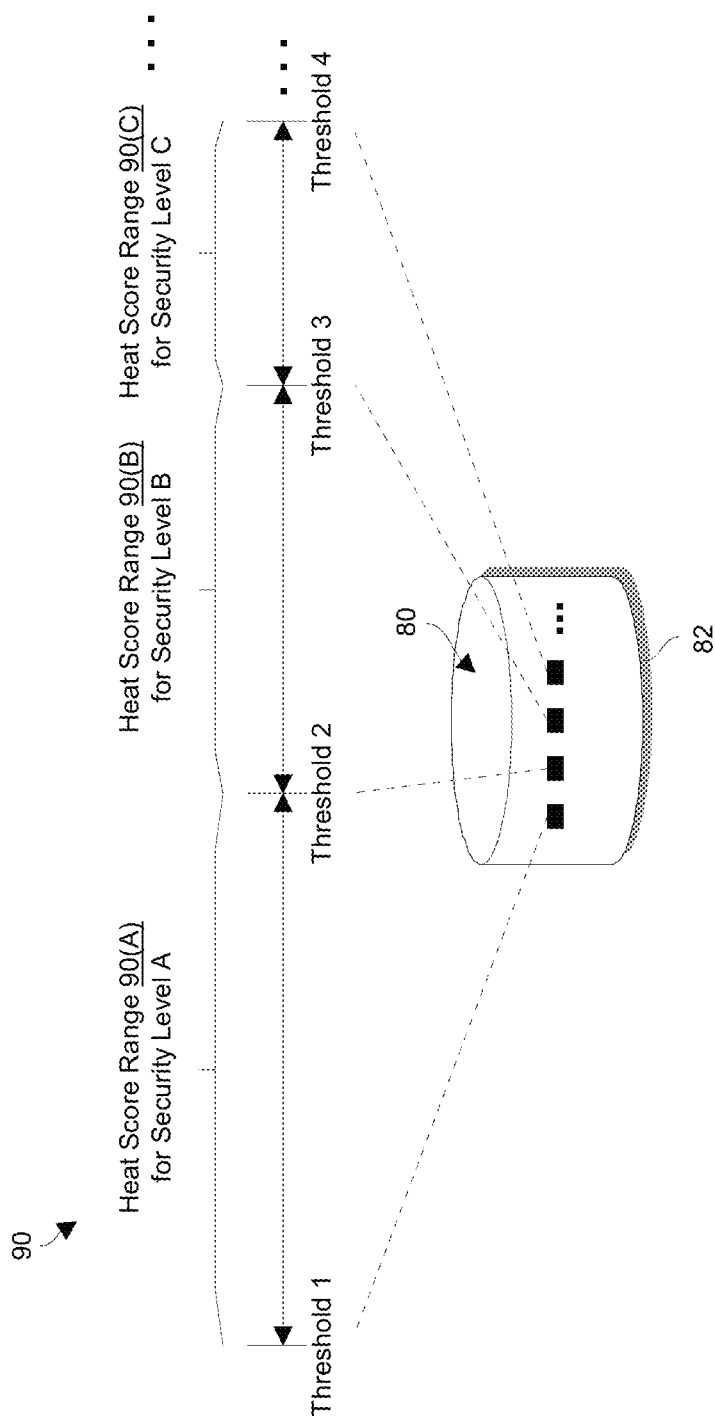
FIG. 3 is a block diagram of a set of heat score thresholds that define a set of heat score ranges which enable identification of particular security levels for different areas of a heat map.

FIG. 3 shows a set of heat score thresholds 80 in accordance with certain embodiments. Such a set of heat score thresholds 80 may reside in a threshold database 82 of multiple sets which are maintained by the access control circuitry 24 (also see FIG. 1), or may be generated from a default set in response to application of various factors such as time of day, local/global events, etc. (e.g., where system 20 modifies one or more heat score threshold 80).

As shown in FIG. 3, the various heat score thresholds 80 define different heat zone ranges 90 for different levels of security. For example, Threshold 1 and Threshold 2 define a heat zone range 90(A) for a security level A. Similarly, Threshold 2 and Threshold 3 define a heat zone range 90(B) for a security level B, Threshold 3 and Threshold 4 define a heat zone range 90(C) for a security level C, and so on.

At this point, it should be understood that each heat map 60 may change dynamically over time. In particular, as users operate the individual endpoint devices 22 within the computerized system 20, system 20 routinely receives new security scores (S), mobility scores (M), and locations for each endpoint device 22. Accordingly, any of the security scores (S), mobility scores (M), and locations may change for the individual endpoint devices 22. As a result, the individual heat scores (H) and/or the overall heat scores (OH) for each area may change.

Additionally, the selected set of heat score thresholds 80 may change over time. For example, the selected set of heat score thresholds 80 may change due to various factors such as based on time of day/week, due to detected local or global events, etc.

With these various parameters changing dynamically, the heat maps 60 may change (e.g., boundaries between security zones 70 may move, security zones 70 may increase/decrease in size, etc.). Such operation allows the heat maps 60 to evolve in real time and thus impose different security requirements on the endpoint devices 22 over time. Further details will now be provided with reference to FIG. 4.

Figure 4:
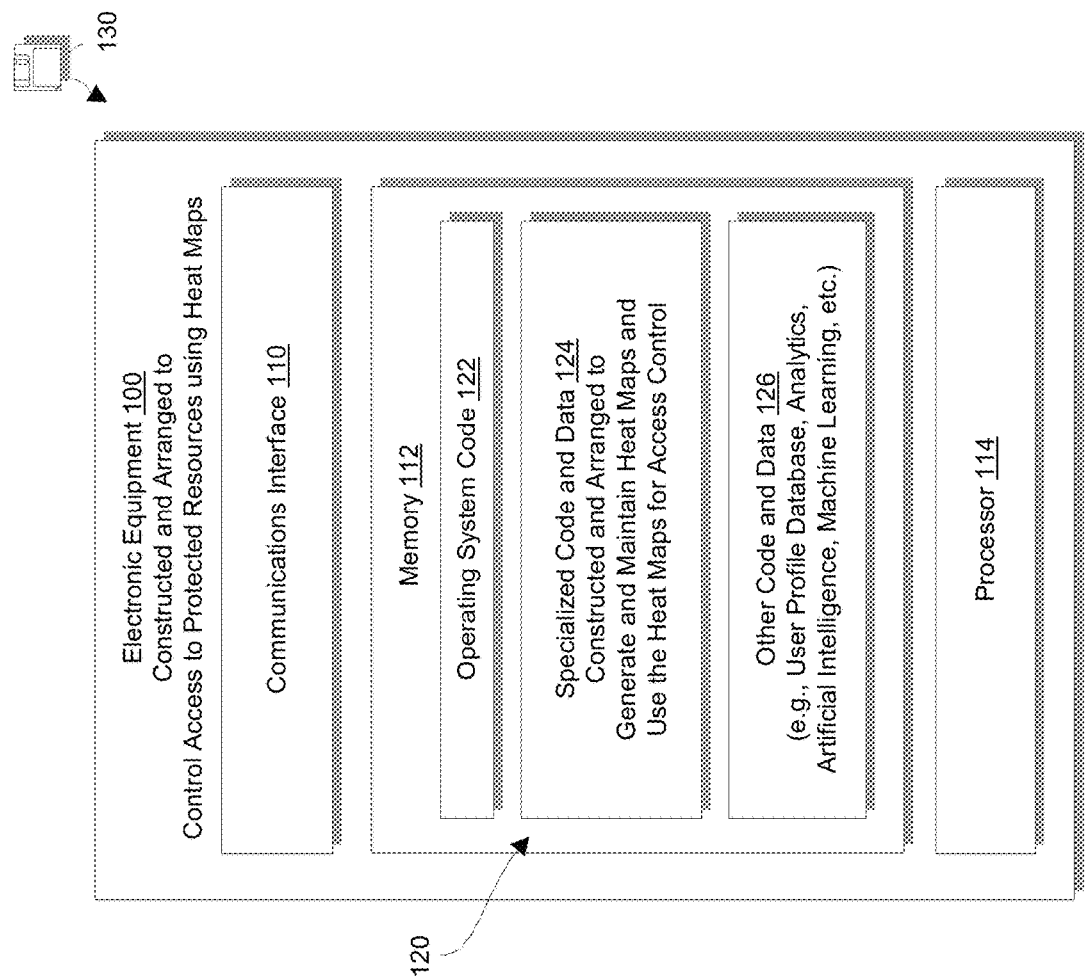
FIG. 4 is a block diagram of electronic equipment that is suitable for use in the computerized system of FIG. 1 in accordance with certain embodiments.

FIG. 4 is a block diagram of electronic equipment 100 that is suitable for use in the computerized system 20 of FIG. 1 in accordance with certain embodiments. The electronic equipment 100 is constructed and arranged to perform at least some of the earlier-described access control operations attributed to the access control circuitry 24 (also see FIG. 1). As shown, the electronic equipment 100 includes a communications interface 110, memory 112, and processor 114.

The communications interface 110 is constructed and arranged to connect the electronic equipment 100 to the communications medium 28 (FIG. 1). Accordingly, the communications interface 110 enables the electronic equipment 100 to communicate with the other components of the computerized system 20. Such communications may be line-based or wireless (i.e., IP-based, cellular, combinations thereof, and so on).

The memory 112 is intended to represent both volatile storage (e.g., DRAM, SRAM, etc.) and non-volatile storage (e.g., flash memory, magnetic disk drives, etc.). The memory 112 stores a variety of software constructs 120 including an operating system 122, specialized code and data 124, and other code and data 126.

Processor 114 may be implemented as one or more processors and is constructed and arranged to operate in accordance with the various software constructs 120 stored in the memory 112. In particular, processor 114, when executing the operating system 122, manages various resources of the electronic equipment 100 (e.g., memory allocation, processor cycles, hardware compatibility, etc.).

Additionally, processor 114 operating in accordance with the specialized code and data 124 forms specialized control circuitry to construct heat maps 60 for different geographic regions and/or use the heat maps 60 to control access to protected resources within the computerized system 20. Accordingly, in accordance with some arrangements, such specialized control circuitry may maintain a heat map repository 62 (also see FIG. 2) and/or a heat score threshold database 82 (also see FIG. 3). In some arrangements, the specialized control circuitry ties in with other security services such as analytics, artificial intelligence, machine learning, combinations thereof, etc.

Furthermore, processor 114 operating in accordance with the other code and data 126 forms other specialized circuitry to perform other operations. Along these lines, the other code and data 126 may include a database of user profiles for various authentication techniques (e.g., password, OTP, knowledge based authentication, biometric authentication, multifactor authentication, combinations thereof, etc.), information for communicating with various external protected resource servers 26 (FIG. 1), parameters/data for other security-related services (e.g., privileges, rights, policies/rules, etc.), and so on.

It should be understood that the electronic equipment 100 may include additional circuitry as well. For example, the electronic equipment 100 may include servers, location sensors/detectors, gateways, communications equipment, etc. that enable and/or provide access control to protected data, protected services, etc.

It should be understood that the above-mentioned electronic equipment 100 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 130 is capable of delivering all or portions of the software constructs 120 to the electronic equipment 100. The computer program product 130 has a non-transitory and non-volatile computer readable medium that stores a set of instructions to control one or more operations of the electronic equipment 100. Examples of suitable computer readable storage media include tangible articles of manufacture and apparatus that store instructions in a non-volatile manner such as CD-ROM, flash memory, disk memory, tape memory, and the like. Further details will now be provided in accordance with certain embodiments.

Security

In accordance with certain embodiments, a security score (S) is provided for each endpoint device 22 of the computerized system 20 (also see FIG. 1). The security score (S) serves as a current measure of trustworthiness contributed by that endpoint device 22. For example, a current low security score (S) may indicate a low trust contribution for the endpoint device 22, and a current high security score (S) may indicate a high trust contribution for the endpoint device 22.

In some arrangements, each endpoint device 22 performs internal operations to provide a respective security score (S). Such operation distributes the work of generating security scores (S) among the endpoint device 22 thus freeing resources of other equipment such as the access control circuitry 24 (FIG. 1) to perform other useful operations.

In other arrangements, external equipment (e.g., a datacenter) remotely monitors and/or assesses various characteristics of each endpoint device 22 and generates a respective security score (S) for that endpoint device 22. Such operation removes the burden (and the possibility of local hacking) from the endpoint devices 22 thus freeing the endpoint devices 22 to perform other useful operations.

Figure 5:
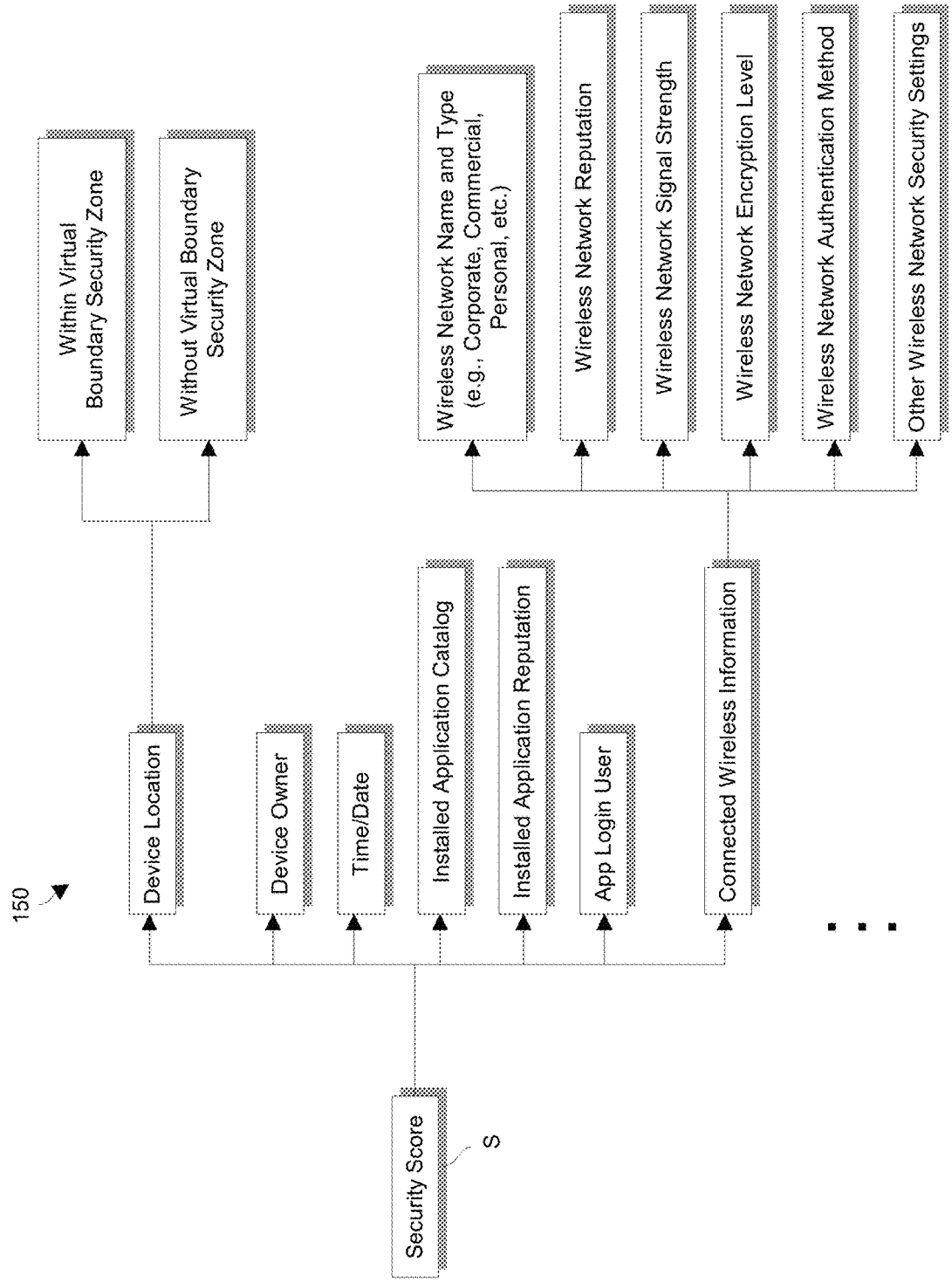
FIG. 5 is a block diagram of example details for a security score which is provided for an endpoint device of the computerized system in accordance with certain embodiments.

FIG. 5 illustrates particular aspects 150 of a security score (S) for an endpoint device 22. Each of the various aspects 150 such as device location, device owner, device time/date, installed application catalog, installed application reputation, app login user, connected wireless network information, etc. represents a particular parameter (or attribute) that contributes to the security score (S). Other aspects are suitable for use in deriving the security score (S) as well such as one or more parameters indicating whether the endpoint device 22 is currently managed (e.g., by an assigned third party service, by the company, etc.) or simply configured in an ad hoc manner by the owner, and so on.

Furthermore, some higher level aspects 150 may have lower level aspects 150 which contribute to the weights of the higher level aspects 150. For example, the device location aspect 150 may be based on lower level aspects 150 such as whether the endpoint device 22 is within a particular zone (e.g., see the security zones 70 in FIG. 2) or outside a particular zone (e.g., in another zone such as an adjacent zone or a designated geofencing zone, in an area where there is not currently an established zone 70, etc.). Similarly, lower level aspects 150 such as wireless network name and type, wireless network reputation, wireless network signal strength, wireless network encryption level, wireless network authentication method, and other wireless network security settings contribute to the connected wireless network information aspect 150.

In the context of external equipment (e.g., the access control circuitry 24 in FIG. 1) remotely monitoring and/or assessing various characteristics of an endpoint device 22, the external equipment may perform extensive computations and/or behavioral comparisons to generate the security score (S) for that endpoint device 22. Along these lines, the external equipment may even employ a third party organization to provide analytics services. In some arrangements, the analytics services include operations that promote/degrade a preliminary security score (S') to generate the security score (S) which is used as an input to the individual heat score (H) for the endpoint device 22.

In accordance with certain embodiments, one or more of the endpoint devices 22 may be an enrolled or managed device (e.g., a device that is configured/provisioned by an enterprise or organization in an ongoing manner). These endpoint devices 22 may routinely communicate with access control circuitry 24 (e.g., to provide status, to receive control parameters/new policy settings/etc. that direct operation of particular applications/processes running on the endpoint devices 22, and so on). Such features may influence the security scores (S) for these endpoint devices 22, as well as influence access control on the set of protected resources.

Mobility

In accordance with certain embodiments, a mobility score (M) is provided for each endpoint device 22 of the computerized system 20 (also see FIG. 1). The mobility score (M) serves as a current measure of mobility contributed by that endpoint device 22. For example, a current low mobility score (M) may indicate a low mobility for the endpoint device 22, and a current high mobility score (M) may indicate a high mobility for the endpoint device 22.

In some arrangements, each endpoint device 22 performs internal operations to provide a respective mobility score (M). Such operation distributes the work of generating mobility score (M) among the endpoint device 22 thus freeing resources of other equipment such as the access control circuitry 24 (FIG. 1) to perform other useful operations.

In other arrangements, external equipment (e.g., a datacenter) remotely monitors and/or assesses various characteristics of each endpoint device 22 and generates a respective mobility score (M) for that endpoint device 22. Such operation is removes the burden of generating the mobility scores (M) (and the possibility of local hacking) from the endpoint devices 22 thus freeing the endpoint devices 22 to perform other useful operations.

Table 1 shows, by way of example, a variety of mobility scores (M) generated for different endpoint device types that travel routinely within certain radii. Along these lines, a workspace hub that operates within a 10 meter radius provides a mobility score of 10, a workstation in the office that operates within a 1 meter radius provides a mobility score of 1, and so on.

TABLE 1

| Endpoint Device Type | Radius (daily track) | Mobility Score |
|---|---|---|
| Workspace Hub | 10 m | 10 |
| Workstation in Office | 1 m | 1 |
| Tablet in Office | 100 m | 100 |
| Laptop Computer | 5 KM | 5,000 |
| Smart Phone | 10 KM | 10,000 |

As shown in Table 1, certain endpoint device types that commonly do not travel long distances provide relatively low mobility scores. By way of example, relatively low mobility scores are provided for a workspace hub which travels 10 meters daily and a workstation which travels 1 meter daily.

In contrast, other endpoint device types that commonly travel long distances provide relatively high mobility scores. By way of example, relatively high mobility scores are provided for a laptop computer which travels 5 kilometers daily and a smart phone which travels 10 kilometers daily.

Additionally, it should be understood that some endpoint device types traveling moderate distances may have medium mobility scores. For example, Table 1 provides medium mobility score for a tablet in the office which travels 100 meters daily.

In accordance with certain embodiments, the greater the daily distance, the higher the mobility score (and vice versa). Accordingly, an office tablet that travels only 50 meters daily would have a lower mobility score that the office tablet that travels 100 meters daily. Furthermore, an office tablet that travels 500 meters daily would have a higher mobility score that the office tablet that travels 100 meters daily.

Other arrangements/configurations are suitable for use as well. For example, in other embodiments, the greater the daily distance, the lower the mobility score (and vice versa).

One should appreciate that the information in Table 1 (or similar type of repository) is provided by way of example and that other fields, data, mobility score arrangements, etc. are suitable for use as well. Along these lines, one should appreciate that in a digital workspace, there are many kinds of endpoint devices. Some of endpoint devices are rich in mobility, such as managed mobile devices because the human users may carry them every day wherever they go. However, other endpoint devices are relatively stationary such as workstation in an office cubical, an Internet-of-Things (IOT) device such as a Raspberry Pi or a workspace hub which typically have mobility within an office facility, and so on.

Furthermore, in accordance with certain embodiments, the system 20 provides a respective mobility score for each endpoint device, by deriving a respective mobility value for that endpoint device based on (i) a device type for that endpoint device, (ii) a daily travel measurement for that endpoint device, and (iii) a comparison between historical tracking data for that endpoint device and current tracking data for that endpoint device. The respective mobility value may serve as the mobility score that identifies the current measure of mobility for that endpoint device.

Other criteria/parameters/features may influence the mobility value of the endpoint devices as well. For example, for devices operated by different users, various mobility data may be historically tracked and compared to current mobility data for those devices. In particular, first mobility data may be tracked and compared for a first device operated by a first user. Likewise, second mobility data may be tracked and compared for a second device operated by a second user, and so on. Accordingly, the mobility value for the first device operated by the first user may be different from the mobility value for the second device operated by the second user, etc. due to differences in each user's mobility data history, even if the devices are identical in terms of hardware version, software version, firmware, updates, etc.

Figure 6:
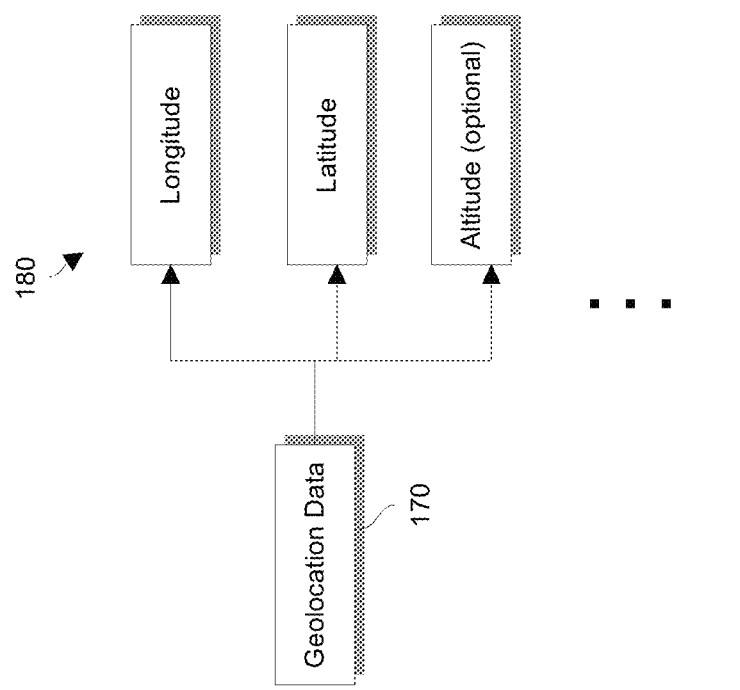
FIG. 6 is a block diagram of example details for geolocation data containing a mobility score which is provided for an endpoint device of the computerized system in accordance with certain embodiments.

FIG. 6 illustrates geolocation data 170 for an endpoint device 22 that is formed by combining (or bundling) location information 180 for that endpoint device 22 with the mobility score (M) for that endpoint device 22. By way of example, the geolocation data 170 for a particular endpoint device 22 includes longitude, latitude, and altitude (optional). Such geolocation data 170 may be captured/maintained by the access control circuitry 24 (FIG. 1).

In some arrangements, the endpoint device 22 performs operations to generate the mobility score (M) and form the geolocation data 170, and then the endpoint device 22 transmits all of the geolocation data 170 to external equipment (e.g., a datacenter). In other arrangements, less than all of the components of the geolocation data 170 are generated and transmitted by the endpoint devices 22 (e.g., only the location information 180).

One should appreciate that there are a variety of suitable sources for the location data 180 (i.e., longitude and latitude readings) for the endpoint devices 22. One suitable source is global positioning system circuitry within the endpoint devices 22 themselves (i.e., receiving the location data directly from the endpoint device 22). Another suitable source is geolocation information which is mapped to local networking equipment, e.g., cellular tower locations, IP connection locations, wireless access points, combinations thereof, etc. (i.e., the location data 180 is received from a device in the middle).

Heat Score for a Single Endpoint Device

Figure 7:
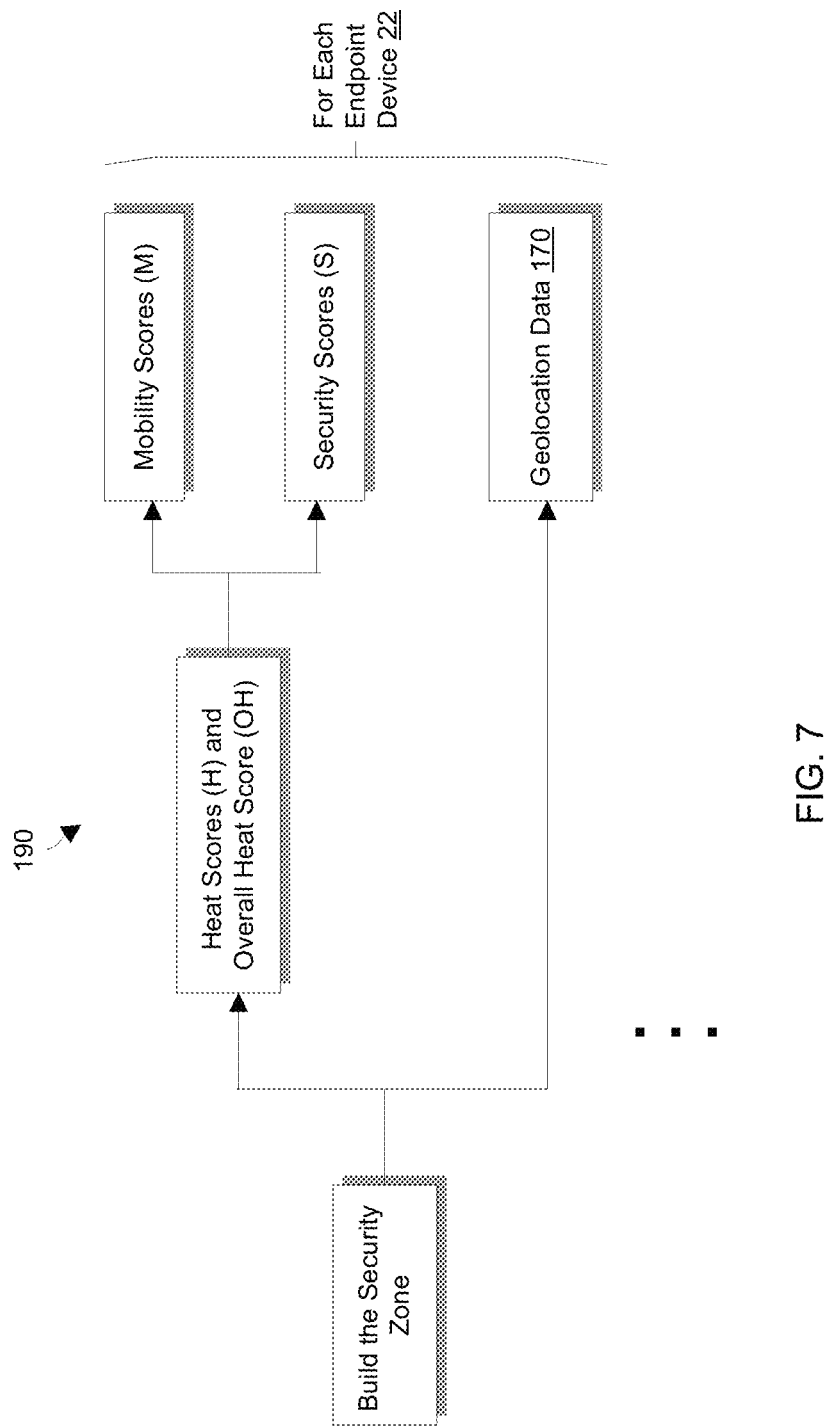
FIG. 7 is a block diagram of various factors that are used to build a security zone for a heat map in accordance with certain embodiments.

FIG. 7 shows the various factors 190 that are used to build a security zone for a heat map (also see FIG. 2). As explained above, for each endpoint device 22, the following are provided: a security score (S), a mobility score (M), and geolocation data 170. With such individual endpoint device information, the security score (S) and the mobility score (M) enable generation of an individual heat score (H) for that endpoint device 22 while that endpoint device 22 resides at a current geolocation identified by the geolocation data 170 for that endpoint device 22.

Equation (1) provides, by way of example, a suitable technique for generating an individual heat score (H) for an endpoint device 22 at a particular time (t).

$$H(t) = \frac{(\sqrt{5}-1)}{2} * S_t + \frac{(3-\sqrt{5})}{2} * M_t \qquad \text{Equation (1)}$$

($S_t$) is the security score (S) at time (t). ($M_t$) is the mobility score (M) at time (t).

In this example, Equation (1) places more weight on the security score (S) than the mobility score (M) (e.g., as a golden ratio). Other weights and techniques for deriving the individual heat score (H) for an endpoint device 22 are suitable for use as well.

Heat Map Generation

With reference still on FIG. 7, the security zones for the heat maps are based on overall heat scores (OH) for different areas, and such overall heat scores (OH) are derived from the individual heat scores (H) and the geolocation data 170 for each endpoint device 22. That is, with individual heat scores (H) available for each endpoint device 22 within the computerized system 20 (FIG. 1), system 20 (e.g., the access control circuitry 24 of FIG. 1) generates heat maps 60 covering geographic regions where the endpoint device 22 currently lie (also see FIG. 2).

In particular, for each area in a heat map 60, system 20 aggregates the individual heat scores (H) for the endpoint devices 22 in that area to provide an overall heat score (OH) for that area (i.e., each area receives the sum of individual heat scores (H) for the endpoint devices 22 currently in that area). As a result, system 20 generates an array of overall heat scores (OH) for the areas of the geographic region covered by the heat map 60.

System 20 then applies a set of thresholds 80 to the array of overall heat scores (OH) to form different zones 70 of trustworthiness 70 within the heat map 60 (e.g., see FIG. 2). Along these lines, the overall heat scores (OH) for some areas within the heat map 60 may fall within a range for a first zone 70(1) of high trustworthiness, the overall heat scores (OH) for other areas within the heat map 60 may fall within a range for a second zone 70(2) of moderate trustworthiness, and so on.

By applying the set of thresholds 80 to the overall heat scores (OH) for all of the areas within the geographic region to identify particular zones 70 for the areas, system 20 forms the heat map 60 (also see FIG. 3). Accordingly, the heat map 60 is essentially a virtual secure crowdsourced geofence area. As a result, the particular level of security (e.g., requirements for successful authentication) imposed on the endpoint devices 22 within the geographic region depends on which zones 70 each endpoint device 22 resides in. For example, a first endpoint device 22 in a first zone of relatively low trustworthiness has a stronger form of security imposed on it than a second endpoint device 22 in a second zone of relatively high trustworthiness.

In other arrangements, an administrator may customize alternative procedures to generate the overall heat scores (OH) differently. Along these lines, other factors may be introduced when generating the overall heat scores (OH).

Additionally, there are different ways to draw heat maps 60. One way to draw a heat map involves Multivariate Functional Depth (MFD) or R. Until now, such functions were simply common mathematic equations and none of them had been applied to use security scores (S) and mobility scores (M) as input before, or their sum used in certain mathematical algorithms. However, in accordance with certain embodiments disclosed herein, a heat map 60 may be viewed as an array of fixed blocks (or areas) and such blocks combine to form different zones 70 due to Multivariate Functional Depth (MFD). By incorporating the overall heat score (OH) of each area, now written as $\Sigma H(t)$, we have the following equation:

$$MFD(X;P_Y;t) = D(X(t)P_Y(t))\Sigma H(t) \qquad \text{Equation (2)}$$

Here, Equation 2 identifies which area (or block) a particular endpoint device 22 falls into. Furthermore, the security level for each block is based on the current time (t).

It should be appreciated that, as long as longitude, latitude, security score (S) and mobility score (M) is provided for an endpoint device 22, a heat map 60 can be draw with a count/depth of different elements: security and mobility.

Take another example, similarly, a Functional Depth (FD)

$$FD(X_t, Y_t; t) = D(X_t, Y_t)\Sigma H(t) \qquad \text{Equation (3)}$$

Here, (X) represents the horizontal coordinate and (Y) represents the vertical coordinate of for a single endpoint device 22. System 20 determines which area the endpoint device 22 falls into, so that there is a general view of endpoint device's security score (S) and mobility score (M) distribution as well as their heading tendency.

Further Access Control Details

Figure 8:
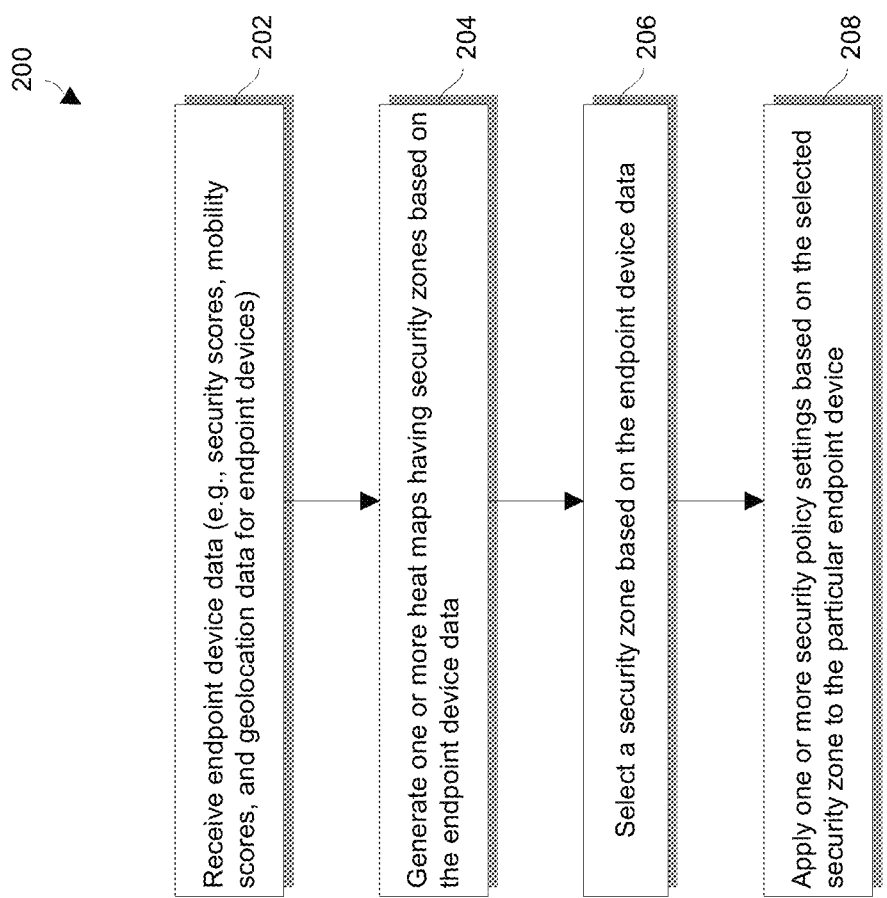
FIG. 8 is a flowchart of a procedure that is performed by the computerized system of FIG. 1 in accordance with certain embodiments.

FIG. 8 is a flowchart of a procedure 200 that in accordance with certain embodiments, is performed by computerized system 20 (e.g., the access control circuitry 24 of FIG. 1) to control access to a set of protected resources. The procedure involves use of a heat map that defines different virtual geofenced areas for different levels of security.

At 202, access control circuitry 24 receives endpoint device data. Such data may include security scores, mobility scores and geolocation data (among other things) for the endpoint devices.

At 204, access control circuitry 24 generates one or more heat maps having security zones based on the endpoint device data. Each heat map may include one or more security zones.

At 206, access control circuitry 24 selects a security zone based on the endpoint device data. Along these lines, for a particular endpoint device, access control circuitry 24 may identify a particular heat map and a particular security zone within that heat map based on the geolocation data for that endpoint device.

At 208, access control circuitry 24 applies one or more security policy settings based on the selected security zone. Along these lines, for the particular endpoint device, access control circuitry 24 may select a particular security level based on the selected security zone and communicate the selected security level to the particular endpoint device to control access to a set of protected resources. For example, the selected security level may define a particular authentication process that must be satisfied in order for access control circuitry 24 to grant access to the set of protected resources. Other examples include assignment of privileges, deploying services, performing transactions and/or updates, and the like.

Figure 9:
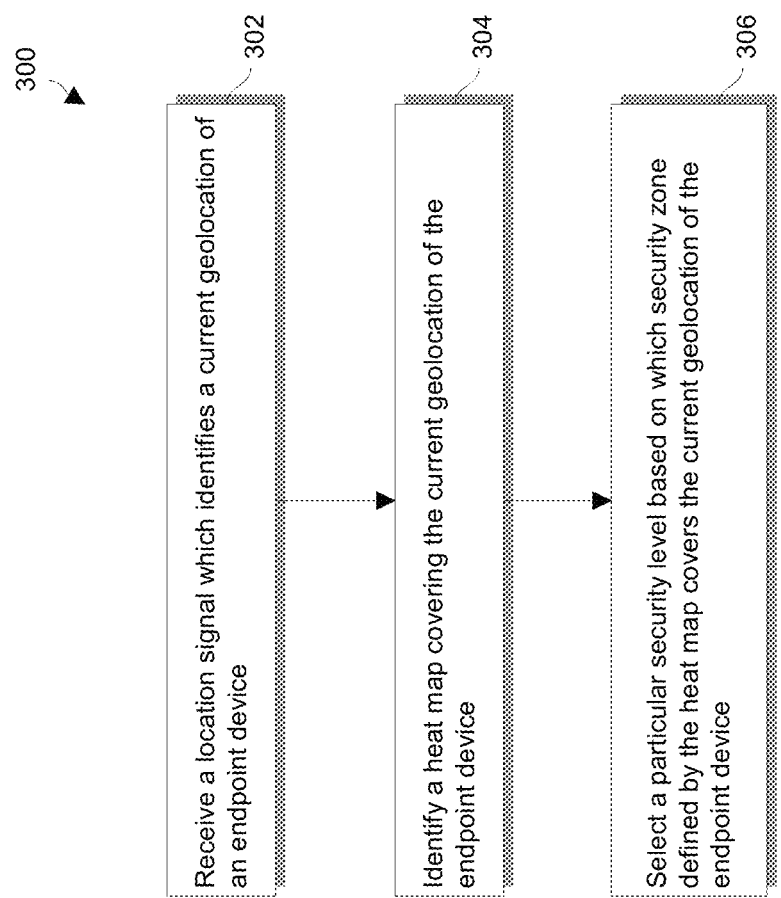
FIG. 9 is a flowchart of another procedure that is performed by the computerized system of FIG. 1 in accordance with certain embodiments.

FIG. 9 is a flowchart of a procedure 300 that, in accordance with certain other embodiments, is performed by computerized system 20 (e.g., access control circuitry 24 of FIG. 1) to control access to a set of protected resources. The procedure involves use of a heat map that defines different virtual geofenced areas for different levels of security.

At 302, access control circuitry 24 receives a location signal which identifies a current geolocation of an endpoint device. Sources of such a location signal may include the GPS circuitry of the endpoint device, wireless devices and/or cellular equipment, and so on.

At 304, access control circuitry 24 identifies a heat map covering the current geolocation of the endpoint device. Along these lines, access control circuitry 24 may perform, based on the current geolocation identified by the location signal, a heat map identification operation that identifies a heat map covering a geographic region that includes the current geolocation of the endpoint device (also see FIG. 2). The heat map may define multiple security zones within the geographic region.

At 306, access control circuitry 24 selects a particular security level based on which security zone defined by the heat map covers the current geolocation of the endpoint device. Along these lines, access control circuitry 24 may perform a security level selection operation that selects a particular security level from multiple security levels based on which security zone of the multiple security zones defined by the heat map covers the current geolocation of the endpoint device. The particular security level may impose a set of security requirements that must be satisfied by the endpoint device in order for the endpoint device to access the set of protected resources. In some arrangements, the particular type of security that is imposed is authentication. However, other types of security are suitable for use as well such as privileges, rights, and so on.

As described above, improved techniques are directed to controlling access to a protected resource using a heat map 60 that defines different zones 70 of trustworthiness within a geographic region. For example, an endpoint device 22 may require (i) relatively weak authentication when the endpoint device 22 is within a well-trusted zone defined by the heat map, (ii) stronger authentication when the endpoint device 22 is within a less-trusted zone defined by the heat map 60, and so on. Moreover, the zones 70 defined by the heat map 60 may change over time (e.g., boundaries between zones 70 may move, zones 70 may grow/shrink, etc.) based on a variety of factors such as the presence/absence of other trustworthy endpoint devices 22 within the vicinity, the time of day, recent events, etc. With such improved techniques, the heat map 60 enables virtual geofencing for access control to be established over any geographic region.

Additionally, one should appreciate that these above-described techniques amount to more than simply performing access control. Rather, the techniques involve generation and utilization of a set of heat maps (e.g., virtual geofences derived by crowdsourcing input from endpoint devices 22). Thus, such operation provides flexibility that would otherwise not be achievable though rudimentary forms of authentication.

Further Heat Map Details

Figure 10:
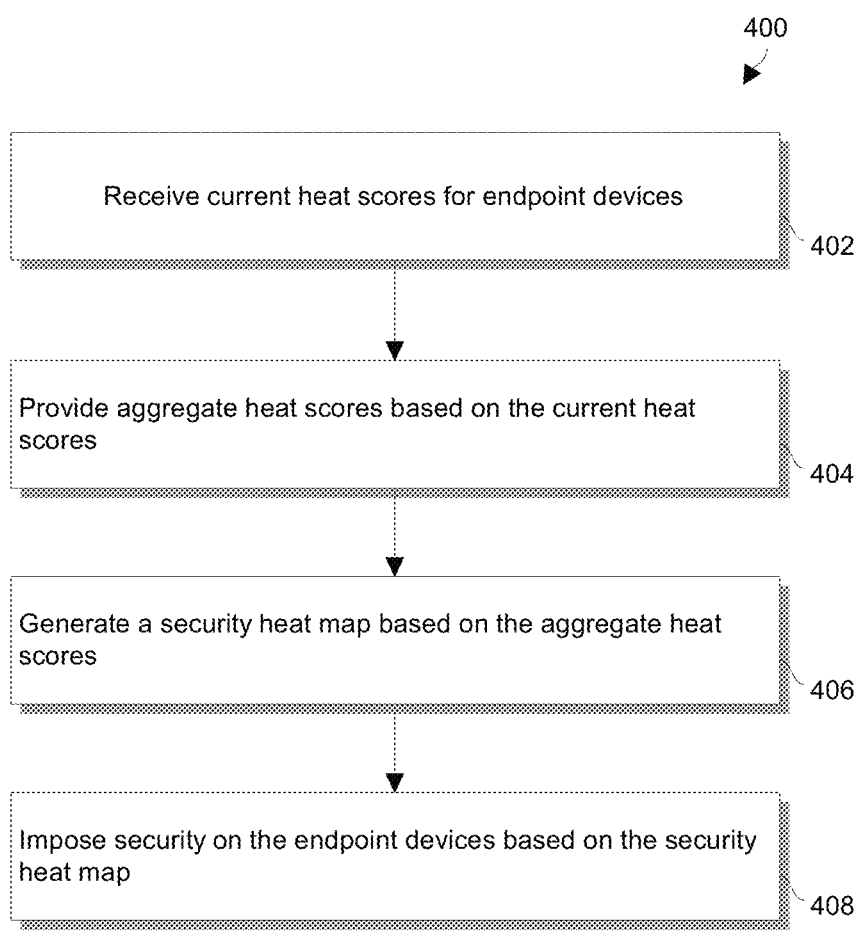
FIG. 10 is a flowchart of another procedure that is performed by the computerized system of FIG. 1 in accordance with certain embodiments.
Figure 11:
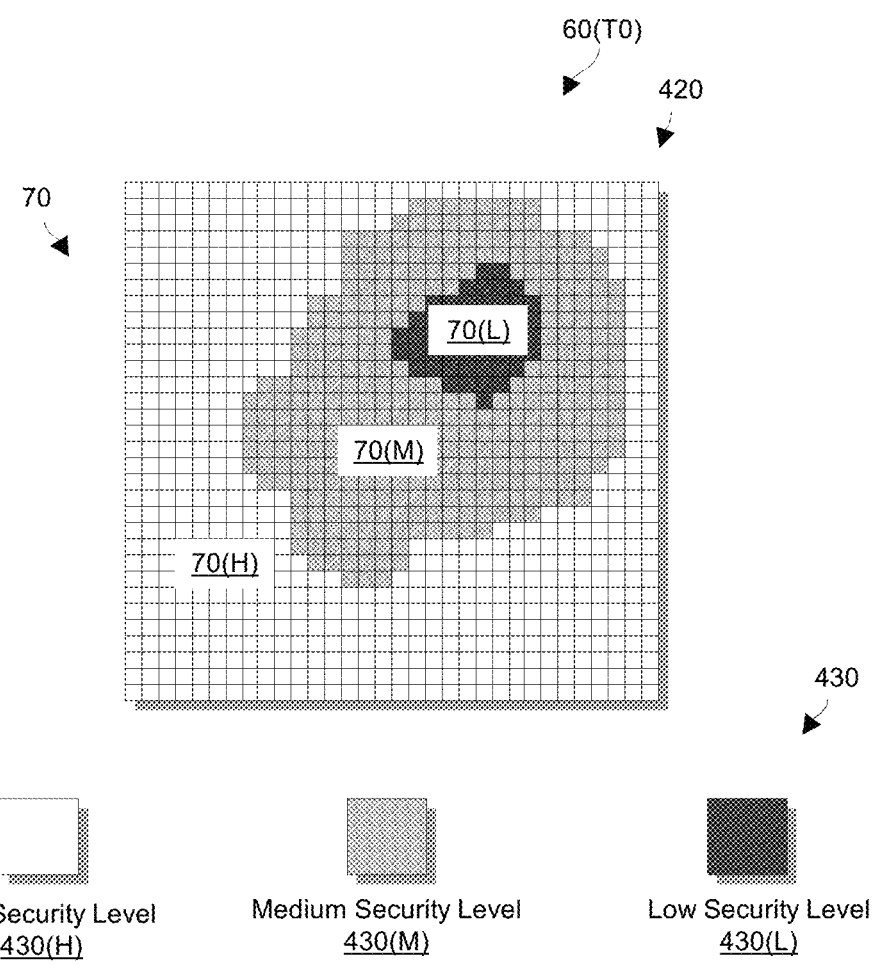
FIG. 11 is a diagram which includes a view of an example heat map for a particular geographic region at a particular time in accordance with certain embodiments.
Figure 12:
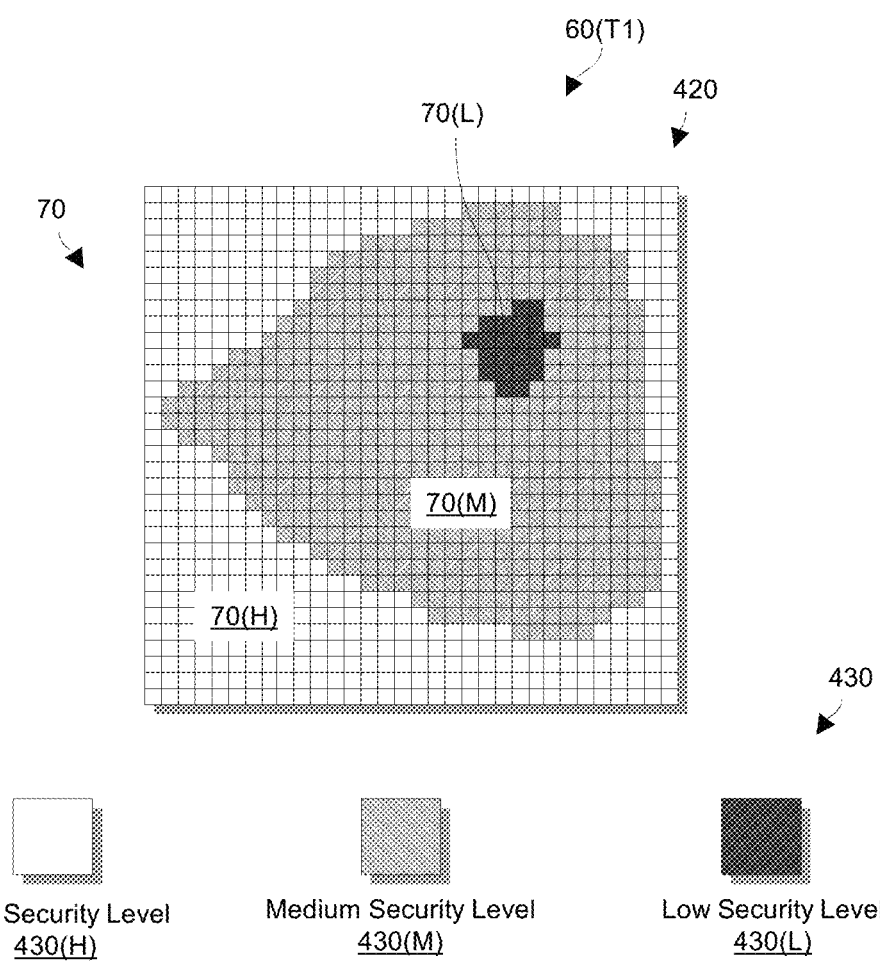
FIG. 12 is a diagram which includes a view of another example heat map for the particular geographic region at another time in accordance with certain embodiments.

FIGS. 10 through 12 show particular heat map details in accordance with certain embodiments. FIG. 10 is a flowchart of a procedure 400 that is performed by the computerized system 20 to generate a security heat map 60 and impose security on endpoint devices using the security heat map 60. FIGS. 11 and 12 show example security heat maps 60 for a particular geographic region at different times of operation to illustrate how security zones 70 may change (e.g., expand, shrink, move, etc.) over time within that geographic region (also see FIG. 2).

With reference to FIG. 10, at 402, the computerized system 20 receives current heat scores (H) for endpoint devices (e.g., enterprise issued devices, enrolled devices, etc.) while users operate the endpoint devices and move among different locations. Along these lines, the computerized system 20 (e.g., the access control circuitry 24) may maintain and update a security score (S) (e.g., a current measures of trustworthiness) and a mobility score (M) (e.g., a current measures of mobility) for each endpoint device. Additionally, the computerized system 20 may generate a respective current heat score (H) for each endpoint device based on the respective security score (S) and the respective mobility score (M) for that endpoint device (also see Equation (1)).

At 404, the computerized system 20 provides aggregate heat scores based on the current heat scores. In particular, for each area within a geographic region, the computerized system 20 may calculate an overall heat score (OH) for that area based on the current heat scores (H) for the endpoint devices currently residing in that area.

At 406, the computerized system 20 generates a security heat map based on the aggregate heat scores. Along these lines, the computerized system 20 may select security levels among multiple selectable security levels for the areas within the geographic region. Such selection may be based on comparing the aggregate heat score for each area to a set of predefined threshold ranges 90 and choosing a particular security level based on matching the aggregate heat score to a particular threshold range 90 (also see FIG. 3). As a result, the heat map may define one or more security zones 70 within the geographic region.

At 408, the computerized system 20 imposes security on the endpoint devices based on the heat map. For example, the computerized system 20 may select a particular set of security policies for all endpoint devices currently residing in a particular area within the geographic region based on the security level selected for that area. The set of security policies may direct the end point devices to require certain forms of authentication to control access to particular protected resources within the computer system 20, allow or prevent operation of certain applications on the endpoint devices, provide certain privileges or services to the endpoint devices, combinations thereof, and so on.

In accordance with certain embodiments, the computerized system 20 re-performs all or part of the procedure 400 (e.g., routinely, in response to an event, combinations thereof, etc.). For example, the computerized system 20 may re-generate the heat map routinely such as every minute, five minutes, 15 minutes, 30 minutes, hour, etc. FIG. 11 shows, by way of example, a security heat map 60(T0) for a particular geographic region at a particular time (T0). The heat map 60(T0) includes blocks 420 arranged in a two-dimensional array. Each block 420 is associated with a particular area within the geographic region, and has a corresponding aggregate heat score and a selected security level 430 based on the aggregate heat score.

By way of example, generation of the heat map 60(T0) is based on a set of predefined threshold ranges 90 that defines different security levels 430, namely, a high security level 430(H), a medium security level 430(M), and a low security level 430(L). In other arrangements, the set of predefined threshold ranges 90 defines a different number of security levels 430 (e.g., one, two, four, five, etc.). Moreover, the set of predefined threshold ranges 90 may apply to a specific geographic region only or multiple geographic regions.

As shown in FIG. 11, combinations of blocks 420 having the same selected security level form different security zones 70 within the heat map 60(T0). In the example, the blocks 420 having the highest security level 430(H) form the security zone 70(H) which, by way of example only, is the largest security zone defined by the heat map 60(T0). Additionally, the blocks 420 having the medium security level 430(M) form the security zone 70(M). Furthermore, the blocks 420 having the lowest security level 430(L) form the security zone 70(L) which, by way of example only, is the smallest security zone defined by the heat map 60(T0).

At time (T0) and in accordance with the heat map 60(T0) for the geographic region, the computerized system 20 imposes security on the endpoint devices based on where the endpoint devices are located within the geographic region. That is, the high security level is imposed on endpoint devices in areas corresponding to the security zone 70(H), the medium security level is imposed on endpoint devices in areas corresponding to the security zone 70(M), and the low security level is imposed on endpoint devices in areas corresponding to the security zone 70(L).

FIG. 12 shows, by way of example, a newly generated security heat map 60(T1) for the particular geographic region at a particular time (T1). Here, the computerized system 20 has waited for some time to pass following time (T0), before generating the heat map 60(T1). During this time, some endpoint devices may have moved, just turned on, recently de-activated, become newly enrolled, and so on.

By way of example, generation of the heat map 60(T1) is based on the same set of predefined threshold ranges 90 that was used when generating the heat map 60(T0). However, it should be understood that the set of predefined threshold ranges 90 may be changed or updated over time, e.g., by an administrator, in response to an event, etc.

As shown in FIG. 12, the combinations of blocks 420 having the same selected security level form the different security zones 70 within the heat map 60(T1) have changed vis-à-vis those of the heat map 60(T0) (FIG. 11). In particular, there are more blocks 420 having the medium security level 430(M) which form the security zone 70(M). Additionally, there are fewer blocks 420 having the lowest security level 430(L) which form the security zone 70(L). Accordingly, the shapes and locations of the zones 70 have changed. Nevertheless, at time (T1), the computerized system 20 imposes security on the endpoint devices in accordance with the heat map 60(T1).

As mentioned earlier, the computerized system 20 may generate security heat maps 60 for a geographic region periodically. The computerized system 20 may also generate security heat maps 60 for the geographic region in response to one or more events.

Figure 13:
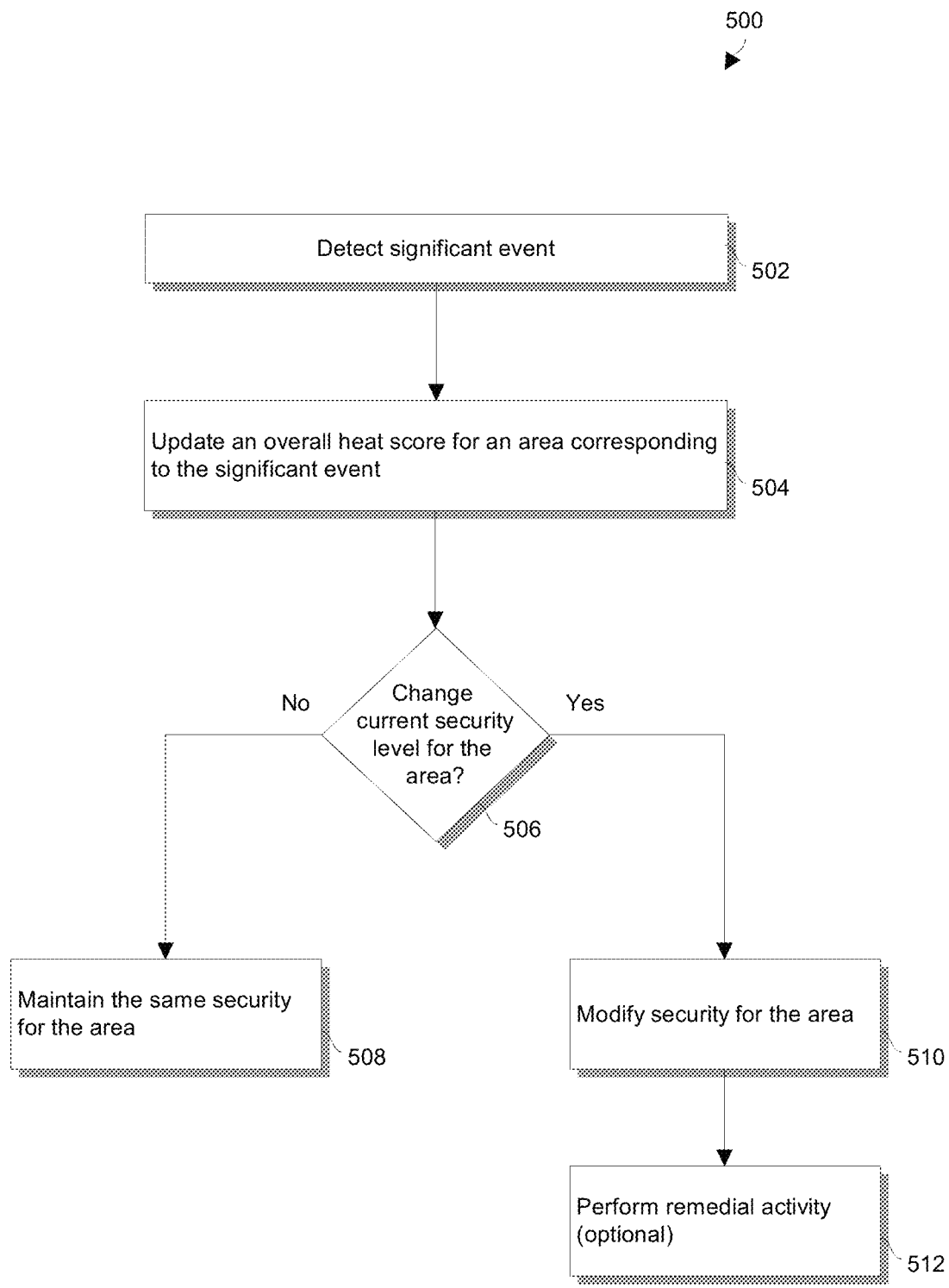
FIG. 13 is a flowchart of another procedure that is performed by the computerized system of FIG. 1 in accordance with certain embodiments.

FIG. 13 is a flowchart of a procedure 500 that is performed by the computerized system 20 in response to significant event. In accordance with certain embodiments, the procedure 500 may be performed in addition to performing the procedure 400 (also see FIG. 10).

At 502, the computerized system 20 detects a significant event. Along these lines, the computerized system 20 may receive an indication signal indicating occurrence of an area-specific event. For example, the computerized system 20 may receive a message that reporting that number of endpoint devices residing within the particular area has changed by more than a predefined threshold number within a predefined amount of time. As another example, the computerized system 20 may receive a message indicating that a predefined number of endpoint devices residing within the particular area have detected a security incident (e.g., a jailbreak attempt, an unsuccessful login limit during a predefined amount of time, a virus or malware, malicious behavior, combinations thereof, etc.).

At 504, the computerized system 20 updates an overall heat score for an area corresponding to the event. In particular, the computerized system 20 may calculate a new aggregate heat score for the particular area and replace an earlier aggregate heat score for the particular area with the new aggregate heat score. The computerized system 20 may calculate the overall heat score for just the area in which the even occurred. However, depending upon the situation, the computerized system 20 may calculate the overall heat score for other areas as well such as immediately adjacent areas, neighboring areas within a particular distance, all of the areas identified the heat map for the same geographic region covering that area, etc.

At 506, the computerized system 20 determines whether there is any change in security level due to updating of the overall heat score for the area. If not, the computerized system proceeds to 508 and, at 508, the computerized system 20 maintains the same security for the area. However, if there is a change in security level, the computerized system 20 proceeds to 510 and, at 510, the computerized system 20 modifies security for the area based on the updated overall heat score for the area. It should be understood that the computerized system 20 may perform similar operations for other areas if the overall heat scores for the other areas have changed as well.

It should be appreciated that modifying the security for any area within a heat map effectively updates the heat map (e.g., see heat maps 60(T0) and 60(T1) in FIGS. 11 and 12). Accordingly, other endpoint devices within an area that has undergone a security change will be affected as well. In particular, the computerized system 20 may select a new set of security policies for that area and then impose the new set of security policies on all of the endpoint devices currently in that area.

Additionally, at 512 which follows 510 (see FIG. 13), the computerized system 20 may optionally perform one or more remedial activities. For example, in response to the change in security, the computerized system 20 may output a signal that alerts a human administrator, the computerized system 20 may modify one or more of the predefined thresholds 90 (FIG. 3), and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the protected resource servers 26 (FIG. 1) are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, cellular-based communications, combinations thereof, and so on. Such modifications and enhancements are intended to belong to various embodiments of the disclosure.

What is claimed is:

1. A method involving a security heat map associated with a geographic region, the method comprising:
   receiving, by a server, current heat scores for one or more endpoint devices located within the geographic region;
   providing, by the server, for areas within the geographic region, respective aggregate heat scores based on the current heat scores for the one or more endpoint devices;
   based on the respective aggregate heat scores for the areas within the geographic region, generating, by the server, a security heat map defining one or more security zones within the geographic region; and
   imposing, by the server, security policies on the one or more endpoint devices based on the security heat map;
   wherein the security heat map defines respective security levels for security zones; and
   wherein imposing the security policies based on the security heat map includes:
   after the security heat map is generated based on the respective aggregate heat scores for the areas within the geographic region, invoking different forms of authentication on endpoint devices based on which security zones the endpoint devices reside in.

2. A method as in claim 1 wherein providing the respective aggregate heat scores includes:
   for each area within the geographic region, calculating a respective aggregate heat score based on current heat scores for endpoint devices currently located within that area.

3. A method as in claim 2, further comprising:
   receiving security scores and mobility scores for the one or more endpoint devices, and
   providing the current heat scores for the one or more endpoint devices based on the security scores and mobility scores.

4. A method as in claim 3 wherein providing the current heat scores for the endpoint devices includes:
   generating a first current heat score for a first endpoint device based on a first security score and a first mobility score for the first endpoint device, and
   generating a second current heat score for a second endpoint device based on a second security score and a second mobility score for the second endpoint device, the first endpoint device being different from the second endpoint device.

5. A method as in claim 4, further comprising:
   providing, as the first security score, a current measure of trustworthiness contributed by the first endpoint device while the first endpoint device is operated by a first user,
   providing, as the first mobility score, a current measure of mobility for the first endpoint device while the first endpoint device is operated by the first user,
   providing, as the second security score, a current measure of trustworthiness contributed by the second endpoint device while the second endpoint device is operated by a second user that is different from the first user, and
   providing, as the second mobility score, a current measure of mobility for the second endpoint device while the second endpoint device is operated by the second user.

6. A method as in claim 4 wherein the first endpoint device currently resides in a first area within the geographic region;
   wherein the second endpoint device currently resides in a second area within the geographic region that is different from the first area; and
   wherein calculating the respective aggregate heat score for each area includes:
   providing a first aggregate heat score for the first area based on the first current heat score for the first endpoint device, and
   providing a second aggregate heat score for the second area based on the second current heat score for the second endpoint device.

7. A method as in claim 4 wherein both the first endpoint device and the second endpoint device currently reside in a particular area within the geographic region; and
   wherein calculating the respective aggregate heat score for each area includes:
   providing a particular aggregate heat score for the particular area based on the first current heat score for the first endpoint device and the second current heat score for the second endpoint device.

8. A method as in claim 2 wherein calculating the respective aggregate heat score for each area includes:
   for a first area within the geographic region, calculating a first aggregate heat score based on current heat scores for a group of first endpoint devices currently located in the first area, and
   for a second area within the geographic region, calculating a second aggregate heat score based on current heat scores for a group of second endpoint devices currently located in the second area, the second area being different from the first area, and the second endpoint devices being different from the first endpoint devices.

9. A method as in claim 8 wherein generating the security heat map defining the one or more security zones within the geographic region includes:
   based on the first aggregate heat score selecting, among multiple selectable security levels, a first security level for the first area to provide at least a portion of a first security zone within the geographic region, and
   based on the second aggregate heat score selecting, among the multiple selectable security levels, a second security level for the second area to provide at least a portion of a second security zone within the geographic region that is different from the first security zone.

10. A method as in claim 8 wherein generating the security heat map defining the one or more security zones within the geographic region includes:
    based on the first aggregate heat score selecting, among multiple selectable security levels, a particular security level for the first area to provide at least a portion of a particular security zone within the geographic region, and
    based on the second aggregate heat score selecting, among the multiple selectable security levels, the particular security level for the second area to provide at least a further portion of the particular security zone within the geographic region.

11. A method as in claim 2, further comprising:
    after the security heat map is generated, receiving an indication signal indicating occurrence of an area-specific event, the indication signal identifying a particular area within the geographic region, and
    in response to the indication signal, calculating a new aggregate heat score for the particular area and replacing an earlier aggregate heat score for the particular area with the new aggregate heat score.

12. A method as in claim 11, further comprising:
    based on the new aggregate heat score selecting, among multiple selectable security levels, a particular security level for the particular area to update the security heat map defining the one or more security zones within the geographic region.

13. A method as in claim 12 wherein a first selectable security level was selected for the particular area based on the earlier aggregate heat score prior to receiving the indication signal; and wherein selecting the particular security level includes:
choosing, as the particular security level, a second selectable security level for the particular area based on the new aggregate heat score, the second selectable security level being different from the first selectable security level.

14. A method as in claim 13 wherein receiving the indication signal indicating the occurrence of the area-specific event includes:
receiving, as part of the indication signal, an indication that the number of endpoint devices residing within the particular area has changed by more than a predefined threshold number within a predefined amount of time.

15. A method as in claim 13 wherein receiving the indication signal indicating the occurrence of the area-specific event includes:
receiving, as part of the indication signal, an indication that a predefined number of endpoint devices residing within the particular area have detected a security incident.

16. A method as in claim 11, further comprising:
after receiving the indication signal and before calculating the new aggregate heat score, receiving new heat scores for endpoint devices currently located within the particular area, the new aggregate heat score for the particular area being calculated based on the new heat scores.

17. A method as in claim 11, further comprising:
in response to the indication signal, calculating new aggregate heat scores for other areas within the geographic region and replacing earlier aggregate heat scores for the other areas with the new aggregate heat scores.

18. A method as in claim 1 wherein invoking the different forms of authentication includes:
instructing, based on the security heat map, each of the one or more endpoint devices to apply a selected form of authentication.

19. A computer program product having a non-transitory computer readable medium that stores a set of instructions involving a security heat map associated with a geographic region; the set of instructions, when carried out by computerized circuitry, causing the computerized circuitry to perform a method of:
receiving current heat scores for one or more endpoint devices located within the geographic region;
providing for areas within the geographic region, respective aggregate heat scores based on the current heat scores for the one or more endpoint devices;
based on the respective aggregate heat scores for the areas within the geographic region, generating a security heat map defining one or more security zones within the geographic region; and
imposing security policies on the one or more endpoint devices based on the security heat map;
wherein the security heat map defines respective security levels for security zones; and
wherein imposing the security policies based on the security heat map includes:
after the security heat map is generated based on the respective aggregate heat scores for the areas within the geographic region, invoking different forms of authentication on endpoint devices based on which security zones the endpoint devices reside in.

20. An electronic apparatus, comprising:
a communications interface;
memory; and
control circuitry coupled to the communications interface and the memory, the memory storing instructions that, when carried out by the control circuitry, cause the control circuitry to:
receive current heat scores for one or more endpoint devices located within a geographic region,
provide for areas within the geographic region, respective aggregate heat scores based on the current heat scores for the one or more endpoint devices,
based on the respective aggregate heat scores for the areas within the geographic region, generate a security heat map defining one or more security zones within the geographic region, and
impose security policies on the one or more endpoint devices based on the security heat map;
wherein the security heat map defines respective security levels for security zones; and
wherein the control circuitry, when imposing the security policies based on the security heat map, is constructed and arranged to:
after the security heat map is generated based on the respective aggregate heat scores for the areas within the geographic region, invoke different forms of authentication on endpoint devices based on which security zones the endpoint devices reside in.

21. An electronic apparatus as in claim 20 wherein the control circuitry, when invoking the different forms of authentication, is constructed and arranged to:
instruct, based on the security heat map, each of the one or more endpoint devices to apply a selected form of authentication.

* * * * *